US009685905B2

(12) United States Patent
Tanaka

(10) Patent No.: US 9,685,905 B2
(45) Date of Patent: Jun. 20, 2017

(54) TERMINAL BOX AND SOLAR CELL MODULE

(71) Applicant: HOSIDEN CORPORATION, Osaka (JP)

(72) Inventor: Toshiya Tanaka, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 0 days.

(21) Appl. No.: 15/137,578

(22) Filed: Apr. 25, 2016

(65) Prior Publication Data

US 2016/0322930 A1    Nov. 3, 2016

(30) Foreign Application Priority Data

Apr. 30, 2015 (JP) ................ 2015-093358

(51) Int. Cl.
*H01R 9/24* (2006.01)
*H05K 5/00* (2006.01)
*H02S 40/34* (2014.01)

(52) U.S. Cl.
CPC .............. *H02S 40/34* (2014.12); *H01R 9/24* (2013.01)

(58) Field of Classification Search
CPC ... H01R 9/24; H01R 4/36; H05K 5/00; H05K 7/02; H05K 13/00; H02G 3/083; H02G 1/00; H02G 3/18; H02G 3/08; H02J 1/10; H02J 1/108; H02S 40/34
USPC ...... 439/709; 361/679.01, 752; 174/547, 60, 174/59
See application file for complete search history.

(56) References Cited

U.S. PATENT DOCUMENTS

| 4,547,827 | A  | * | 10/1985 | Shedd     | H01H 85/44  |
|           |    |   |         |           | 361/104     |
| 2004/0177987 | A1 | * | 9/2004 | Yoshikawa | H01R 9/2425 |
|           |    |   |         |           | 174/59      |
| 2006/0196534 | A1 | * | 9/2006 | Takada    | H01R 9/2425 |
|           |    |   |         |           | 136/244     |

(Continued)

FOREIGN PATENT DOCUMENTS

DE   102004001011 A1   9/2004
EP       2330634 A2    6/2011
(Continued)

OTHER PUBLICATIONS

European Search Report Mailed Sep. 13, 2016.

*Primary Examiner* — Gary Paumen
(74) *Attorney, Agent, or Firm* — Dilworth & Barrese, LLP.

(57) ABSTRACT

A terminal box includes three or more terminal strips to which output lines of a solar cell module are connected and a box body having an accommodating portion for accommodating the three or more terminal strips. The box body includes inlet holes formed in a face of the box body opposing to the solar cell module and configured for allowing insertion of the output lines corresponding respectively to the three or more terminal strips. The three or more terminal strips include at least two first terminal strips of a same polarity and at least one second terminal strip insulated from the first terminal strips and having the opposite polarity to that of the first terminal strips. The two first terminal strips are electrically connected via a connecting portion disposed on a back face side of the second terminal strip disposed between and aside the two first terminal strips.

16 Claims, 8 Drawing Sheets

(56) References Cited

U.S. PATENT DOCUMENTS

| | | | |
|---|---|---|---|
| 2009/0086444 A1* | 4/2009 | Yoshikawa | H02S 40/34 361/752 |
| 2010/0294529 A1* | 11/2010 | Nunokawa | H01R 4/18 174/60 |
| 2011/0136395 A1* | 6/2011 | Yamazaki | H02S 40/34 439/709 |
| 2012/0048615 A1* | 3/2012 | Masumoto | H02S 40/34 174/547 |
| 2012/0075825 A1* | 3/2012 | Yamazaki | H02S 40/34 361/809 |
| 2012/0314356 A1* | 12/2012 | Yoshikawa | H02S 40/34 361/679.01 |
| 2013/0265691 A1* | 10/2013 | Ohmori | H02J 1/108 361/601 |
| 2016/0020591 A1* | 1/2016 | Tanaka | H02G 3/083 174/541 |
| 2016/0322930 A1* | 11/2016 | Tanaka | H01R 9/24 |

FOREIGN PATENT DOCUMENTS

| | | |
|---|---|---|
| JP | 2001-308361 | 2/2001 |
| JP | 3656391 | 3/2005 |

\* cited by examiner

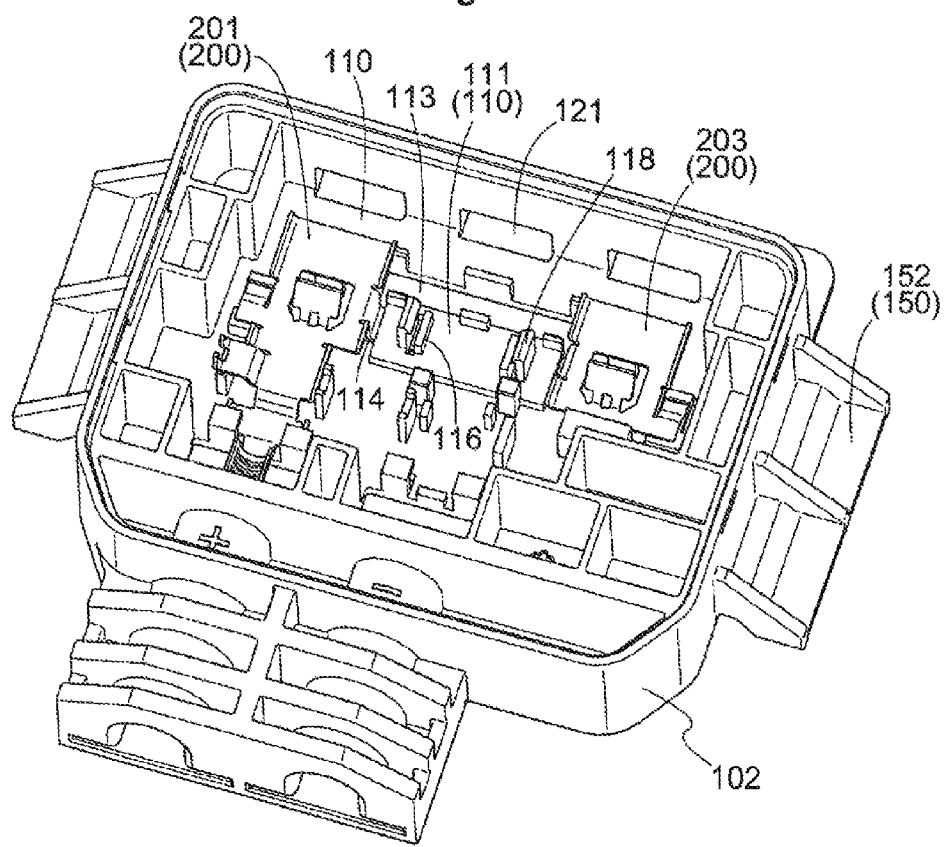

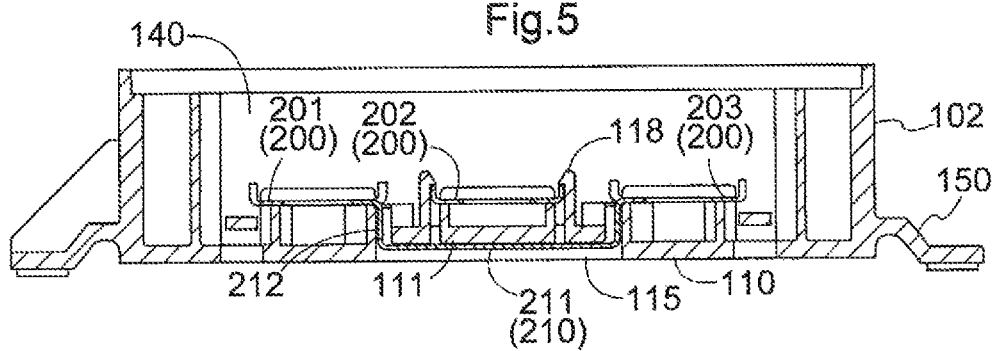
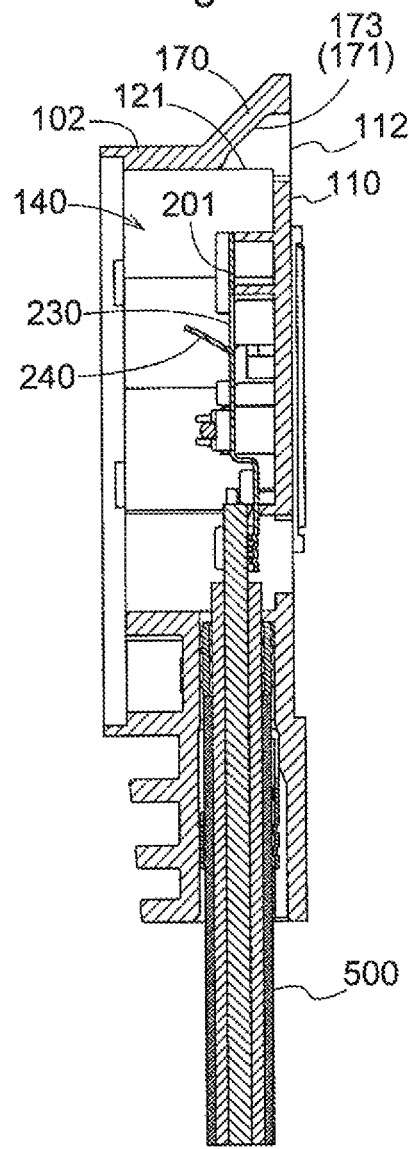

TERMINAL BOX AND SOLAR CELL MODULE

CROSS REFERENCE TO RELATED APPLICATION

This application is based on and claims priority under 35 U.S.C. Section 119 to Japanese Patent Application No. 2015-093358 filed on Apr. 30, 2015, the entire content of which is incorporated herein by reference.

TECHNICAL FIELD

This disclosure relates to a terminal box and a solar cell module to which the terminal box is connected.

RELATED ART

With a solar power generation system, a DC power generated in a plurality of solar cell modules mounted on a roof of a house is converted into an AC power by a power conditioner (inverter) and supplied as such to various electric products. The plurality of solar cell modules are connected in series by an external cable via terminal boxes mounted on back faces of the respective solar cell modules.

Generally, the terminal box is configured such that a positive output line and a negative output line and an output cable of the solar cell module are connected to a plurality of terminal strips that are disposed within a main box with an open top and a bypass diode is provided between the terminal strips.

As shown in Japanese Patent No. 3656391, a terminal box having three terminal strips disposed side by side is known. In this case, e.g. two first terminal strips which are positive pair with a second terminal strip which is negative. When the two first terminal strips are disposed in close proximity, connection therebetween is easy. However, in case a second terminal strip is to be disposed between two first terminal strips, the two first terminal strips will be connected with bypassing the second terminal strip.

Japanese Unexamined Patent Application Publication No. 2001-308361 discloses a solar cell module having a plurality of wiring patterns in a terminal box. Between two wiring patterns connected to a negative cable, one wiring pattern connected to a positive cable is disposed and the negative wiring patterns are connected via a jumper line which extends above the positive wiring pattern.

SUMMARY

Within a terminal box, output lines and terminal strips provided in a solar cell module are connected. The output lines are generally mounted and connected on the upper faces of the terminal strips. For this reason, in the case of the arrangement disclosed in the Japanese Unexamined Patent Application Publication No. 2001-308361 where two first terminal strips of a same polarity are connected upwardly of the second terminal strip of the opposite polarity, there can occur an inadvertent contact between the output line connected to the second terminal strip and the interconnecting portion of the two first terminal strips, thus resulting in short circuit between the first terminal strips and the second terminal strip.

According to an embodiment of the present disclosure, there is disclosed a terminal box that allows favorable connection between terminal strips of a same polarity disposed on opposed sides of a terminal strip of the opposite polarity and that also realizes reliable prevention of short circuit with the terminal strip of the opposite polarity.

According to one embodiment of a terminal box relating to the present disclosure, a terminal box comprises:

three or more terminal strips to which output lines for extracting electric power generated by a solar cell module are connected; and a box body having an accommodating portion for accommodating the three or more terminal strips;

wherein the box body includes inlet holes formed in a face of the box body opposing to the solar cell module and configured for allowing insertion of the output lines corresponding respectively to the three or more terminal strips; and wherein the three or more terminal strips include at least two first terminal strips of a same polarity and at least one second terminal strip insulated from the first terminal strips and having the opposite polarity to that of the first terminal strips; and wherein the two first terminal strips are electrically connected via a connecting portion disposed on a back face side of the second terminal strip disposed between and aside the two first terminal strips.

Connection between the output lines of the solar cell module and the terminal strips accommodated in the terminal box is conventionally done on the front face side (upper side) of the terminal strips. On the other hand, according to the above-described arrangement, of the three or more terminal strips provided in the terminal box, the first terminal strips of a same polarity are connected via a connecting portion on the back face side (underneath) of the second terminal strip of the opposite polarity. With this arrangement, unlike the arrangement wherein the terminal strips of a same polarity are connected e.g. along a lateral wall of the box body, the connecting portion will not pose any obstruction when the output lines are to be inserted into the accommodating portion. This connecting portion is connected to the first terminal strips with reliably avoiding accidental contact with the output lines which are connected on the front face side of the second terminal strip. Further, as the connecting portion between the first terminal strips is disposed on the back face side of the second terminal strip, a mounting area of the terminal box relative to the solar cell module can be made small, whereby power generation efficiency of the solar cell module can be increased advantageously.

According to one embodiment of the terminal box relating to the present disclosure, the inlet holes are formed outside an occupying area of the three or more terminal strips in the face opposing to the solar cell module.

If the inlet holes were formed within the occupying area of the three or more terminal strips in the face opposing to the solar cell module, the output lines inserted through these inlet holes may sometimes be disposed on the back face side of the second terminal strip. For this reason, since the connecting portion interconnecting the first terminal strips of a same polarity needs to be disposed at a position clear of the inlet holes, the area for disposing the connecting portion would be limited disadvantageously.

On the other hand, if the inlet holes are formed outside an occupying area of the three or more terminal strips in the face opposing to the solar cell module as provided in the above-described arrangement, the connecting portion can be disposed regardless of the positions of the inlet holes, so the freedom in the layout of the connecting portion will be increased advantageously.

According to one embodiment of the terminal box relating to the present disclosure, the terminal box further comprises an insulating portion which is formed integral with the box body and which is interposed between the second terminal strip and the connecting portion along the face opposing to the solar cell module.

With the above-described arrangement, the insulating portion is interposed between the connecting portion and the second terminal strip of the opposite polarity on the back face side thereof. With this, the insulation performance between the second terminal strip and the connecting portion of the first terminal strips is improved.

According to one embodiment of the terminal box relating to the present disclosure, the two first terminal strips and the connecting portion are formed integral.

With the above-described arrangement wherein the two first terminal strips and the connecting portion are formed integral, there is no need for providing separately an arrangement for connecting the two first terminal strips and the connecting portion. Therefore, the connection arrangement of the two first terminal strips can be realized easily. Further, the number of parts or components to constitute the terminal box can be reduced.

According to one embodiment of a solar cell module relating also to the present disclosure, the solar cell module comprises:

output lines for extracting electric power disposed at an edge portion; and the terminal box according to any one of the above-described arrangements connected to the edge portion.

In the terminal box connected to the output lines provided at the edge portion of the solar cell module, the inlet holes for the output lines are formed at an end portion of the terminal box. On the other hand, the connecting portion of the first terminal strips of a same polarity is disposed on the back face side of the second terminal strip of the opposite polarity. Thus, relative to the output lines to be inserted from the end portion of the box body, the connecting portion of the first terminal strips can be readily spaced apart therefrom within the area of the second terminal strip, so that the two first terminal strips can be connected with disposing the connecting portion thereof being disposed at an appropriate position free from accidental contact with the conductor of the opposite polarity.

Moreover, since the connecting portion of the first terminal strips is disposed on the back face side of the second terminal strip in the terminal box, there occurs no extension/enlargement of the accommodating portion for the terminal strips in the direction along the solar cell module. Consequently, the terminal box can be formed compact.

BRIEF DESCRIPTION OF DRAWINGS

FIG. 4 is a perspective view showing the terminal box with its top plate being removed, FIG. 5 is a section view taken along a line V-V in FIG. 1, FIG. 6 is a section view taken along a line VI-VI in FIG. 1.

DESCRIPTION OF EMBODIMENTS

1. Configuration of Terminal Box

Figure 1:
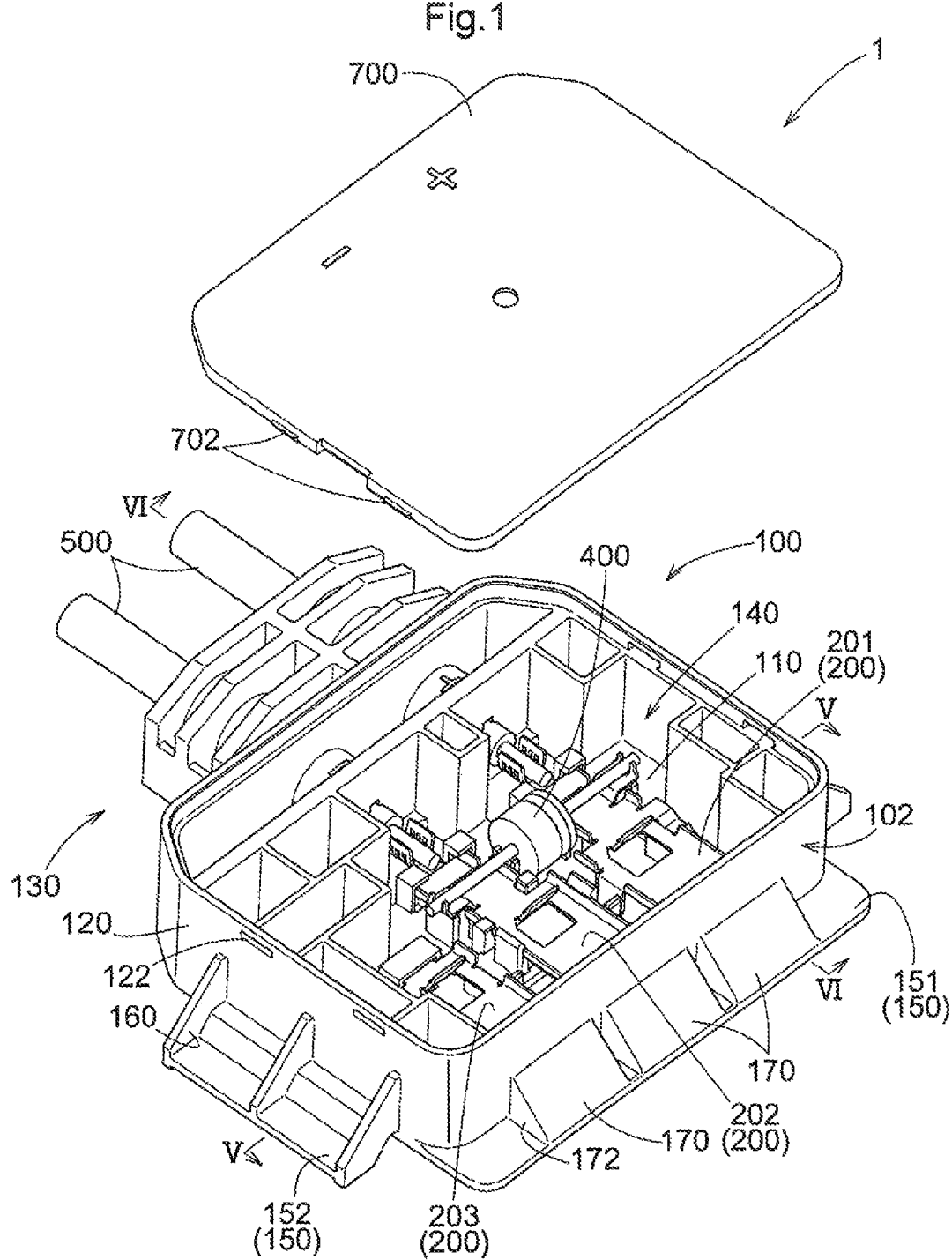
FIG. 1 is a perspective view showing a terminal box according to an embodiment.

Next, an embodiment of a terminal box relating to the present disclosure will be explained with reference to the accompanying drawings. As shown in FIGS. 1-6, a terminal box 1 includes a box body 100, a lid body 700, three terminal strips 200 mounted inside the box body 100, a diode 400, and output cables 500. The box body 100 and the lid body 700 are formed of insulating material such as resin, whereas the terminal strips 200 are formed of a metal such as copper alloy or the like. The box body 100 is formed like a box having a top opened. The upper opening of the box body 100 can be closed with the lid body 700. Incidentally, in the following discussion, when there arises a need to discriminate the three terminal strips 200 from each other, two terminal strips 200 of a same polarity will be referred to as first terminal strips 201, 203, and a terminal strip 200 having the opposite polarity to that of the first terminal strips 201, 203 will be referred to as a second terminal strip 202, respectively.

The box body 100 includes an accommodating portion 102 and a cable holding portion 130. The cable holding portion 130 defines two through holes (not shown). Into these two through holes, the two output cables 500 of the positive polarity and the negative polarity are inserted and these cables are fixed to the box body 100 via a cable holder (not shown). In the following discussion, in the box body 100, one side thereof where the cable holding portion 130 is provided will be referred to as "rear side", the side opposite the rear side will be referred to as the "front side", the opened side will be referred to as the "upper side" and the side opposite thereto will be referred to the "lower side", and the direction perpendicular to the front-rear direction and upper-lower direction will be referred to as left-right direction (disposing direction of the terminal strips), respectively.

Figure 7:
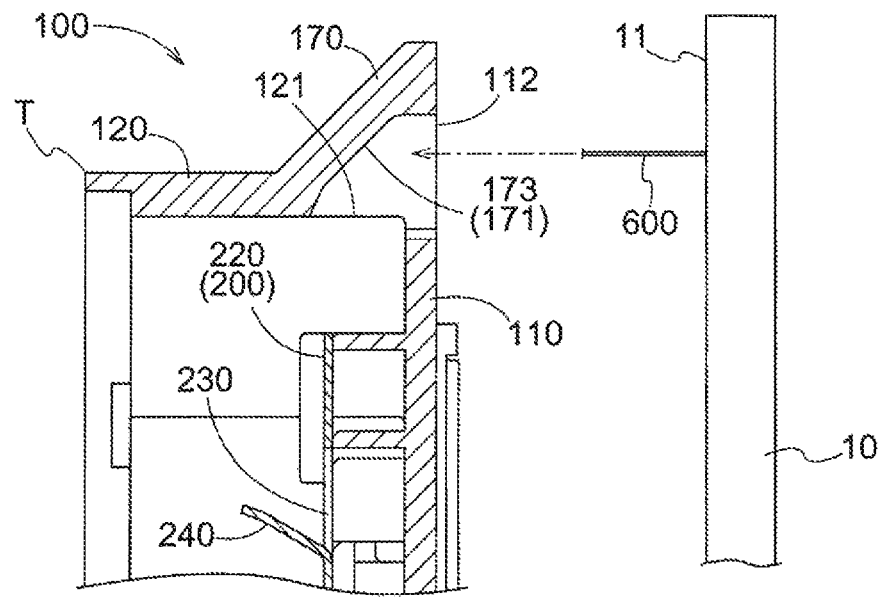
FIG. 7 is a section view illustrating a procedure of connecting output lines to terminal strips.
Figure 8:
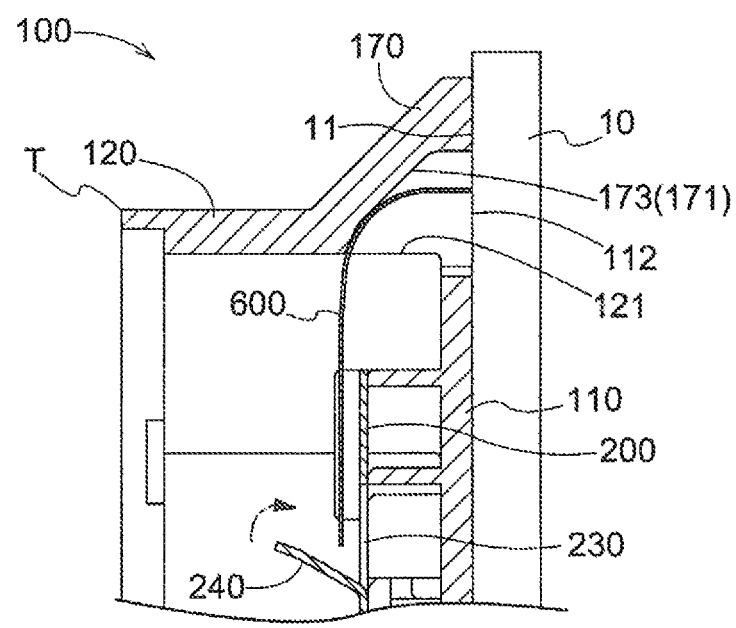
FIG. 8 is a section view illustrating a procedure of connecting output lines to terminal strips.
Figure 9:
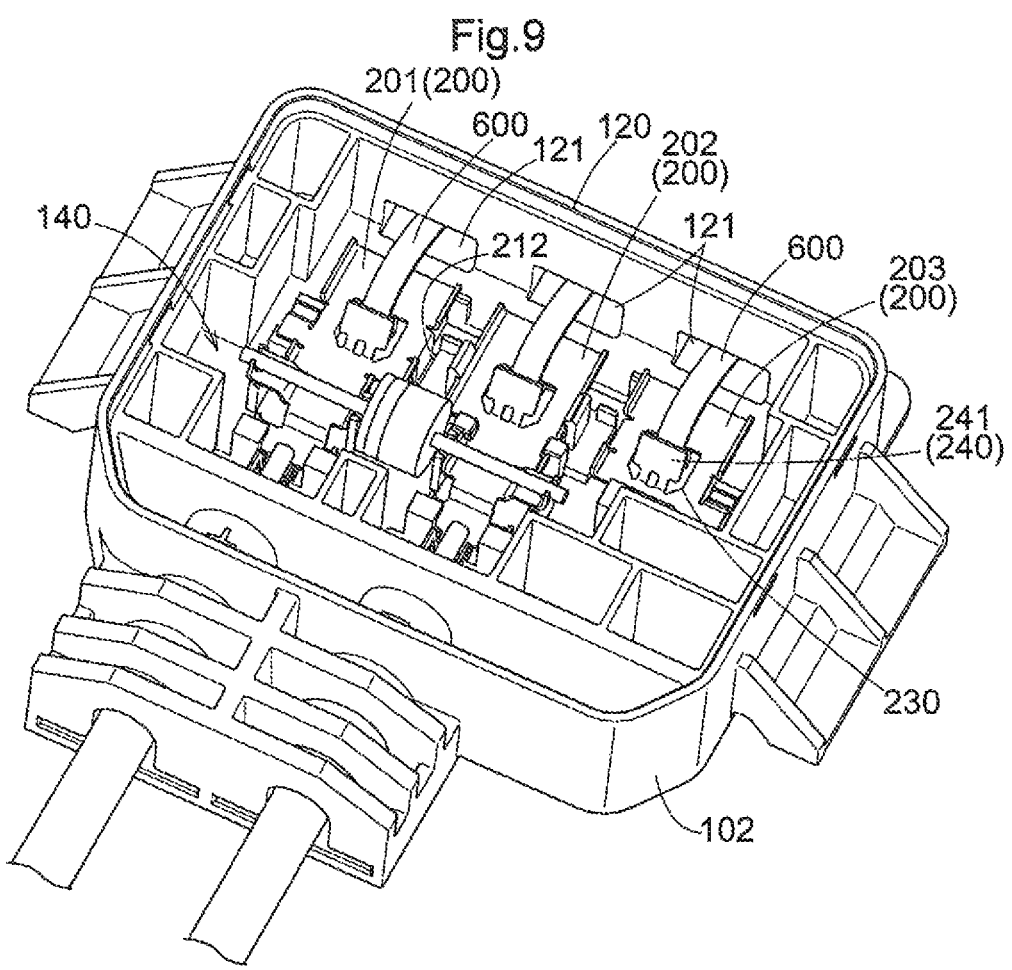
FIG. 9 is a perspective view showing the output lines as being connected to the terminal strips.

The accommodating portion 102 includes a bottom wall 110 and a lateral wall 120 extending erect from the circumferential edge of the bottom wall 110 and surrounding three directions. The bottom wall 110 is provided on the face opposing to the solar cell module 10. The bottom wall 110, the lateral wall 120 and the front-side end wall of the cable holding portion 130 together delimit an accommodating space 140 (an example of "space"). With this, the accommodating portion 102 is formed like a box having an open top. Inside the accommodating space 140, the three terminal strips 200 and the diode 400 are accommodated. The solar cell module 10 (see FIG. 7) includes an output line 600 for extracting power generated therein. The output line 600 and the output cables 500 are electrically connected to the terminal strips 200. With these arrangements, electric power generated in the solar cell module 10 is outputted from the output cables 500 via the terminal strips 200. Incidentally, the configuration of the terminal strips 200 will be described later. The output line 600 is a band-like electric terminal as shown in FIGS. 7-9.

Figure 3:
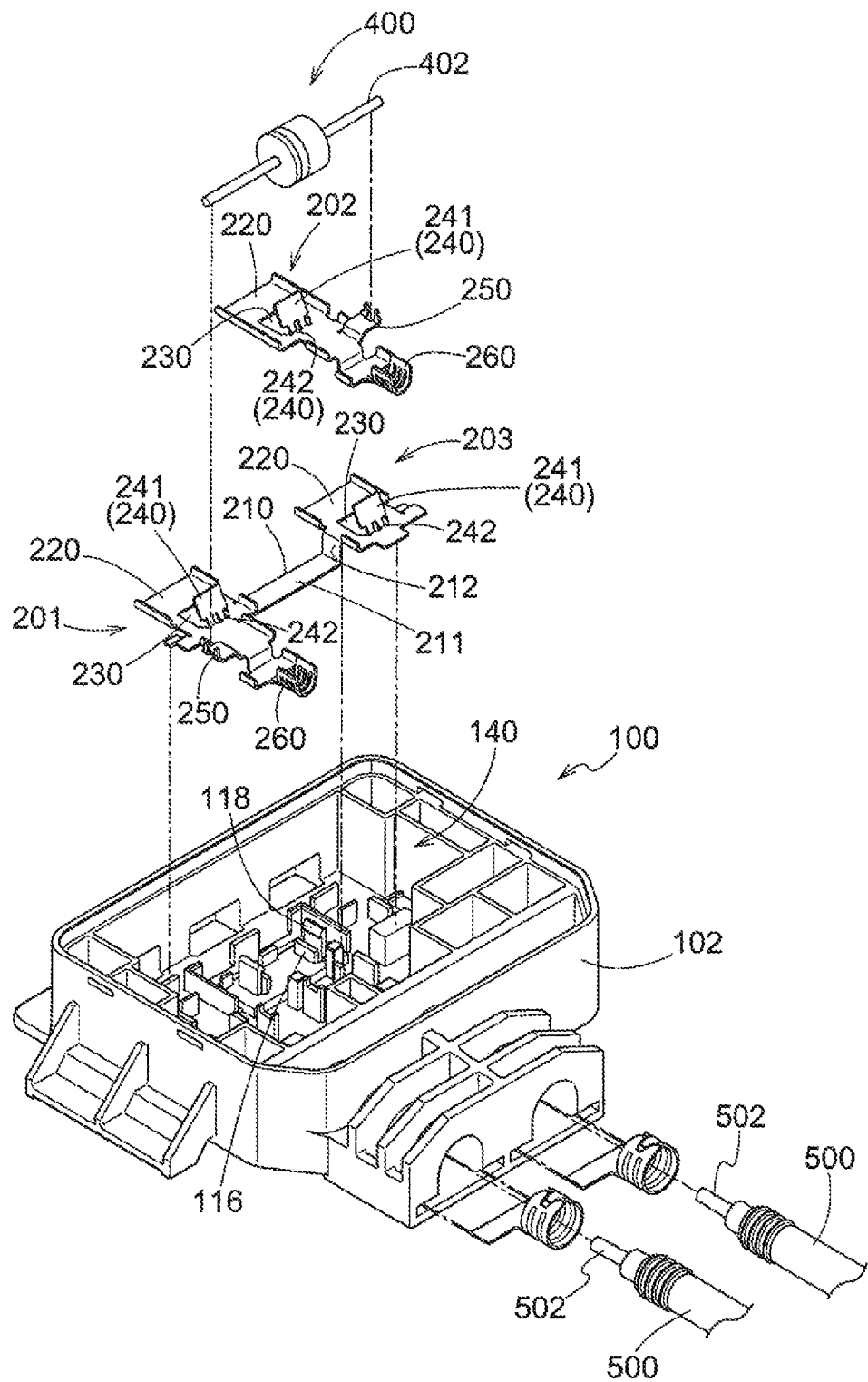
FIG. 3 is an exploded perspective view showing a configuration of the terminal box with terminal strips etc. thereof being removed from an accommodating portion.

As shown in FIG. 3 and FIG. 4, on the upper face of the bottom wall 110, there are formed a plurality of projections 116 and pawl portions 118, so that the terminal strips 200 are supported by the projections 116 and the fixed by the pawl portions 118. That is, the terminal strips 200 are spaced apart from the upper face of the bottom wall 110 by an amount corresponding to the height of the projections 116.

As shown in FIG. 1, in the bottom wall 110, there are formed flange portions 150 which extend outward from the front and left and right side walls 120. In the front side flange portion 151, there are provided guiding portions 170 which will be described later. The left and right flange portions 152 are provided at intermediate portions in the front-rear direction of the lateral wall 120. Further, for improvement of the strength of these flange portions 152, ribs 160 extending in the left-right direction are provided forwardly, centrally and rearwardly of the flange portions 152. Further, adjacent the upper end portions of the left and right side walls 120, there are provided two retaining holes 122 respectively for the lid body 700.

As shown in FIG. 1, the lid body 700 is a flat plate-like member for closing the upper opening of the accommodating portion 102. The shape of the lid body 700 is adapted to the planar-viewed shape of the accommodating portion 102 and this, in this embodiment, is an approximately rectangular shape. In the terminal box 1 of the instant embodiment, the lid body 700 constitutes the upper (top) wall of the terminal box 1.

The left and right side walls of the lid body 700 respectively include two retaining pawls 702 projecting laterally. These retaining pawls 702 are to be engaged into the retaining holes 122 defined in the lateral wall 120. With this, the lid body 700 is retained and fixed relative to the box body 100.

Of the three terminal strips 200 disposed side by side in the accommodating portion 102, the two first terminal strips 201, 203 disposed on the opposed sides are both terminal strips 200 of the positive polarity, whereas the second terminal strip 202 disposed centrally thereof is the terminal strip 200 of the negative polarity. The first terminal strips 201, 203 are insulated from the second terminal strip 202. Whereas, the first terminal strips 201, 203 are electrically conducted to each other via a connecting portion 210 which will be described later. To the first terminal strip 201, the output cable 500 of the positive polarity is connected. To the second terminal strip 202, the output cable 500 of the negative polarity is connected. Whereas, the first terminal strip 203 has no connecting portion to be connected to the output cable 500 of the positive polarity.

As shown in FIG. 3, the terminal strips 200 respectively include a mounting portion 220, an opening 230, and a pivot holding portion 240. The first terminal strip 201 and the second terminal strip 202 respectively further include a diode connecting portion 250 and a cable connecting portion 260. The mounting portion 220 is a flat face having a predetermined area, on which the leading end of the output line 600 is to be mounted for ensuring electrical connection with the terminal strip 200.

The two first terminal strips 201, 203 are electrically connected to each other via the connecting portion 210. This connecting portion 210 includes a connecting portion body 211 and raised portions 212.

The connecting portion body 211 is a flat plate having a rectangular shape. And, opposed right/left ends of this connecting portion body 211, the raised portions 212 are formed erect. To the upper ends of the raised portions 212, the two first terminal strips 201, 203 are connected. In the instant embodiment, the two first terminal strips 201, 203 and the connecting portion 210 are formed integral.

Figure 2:
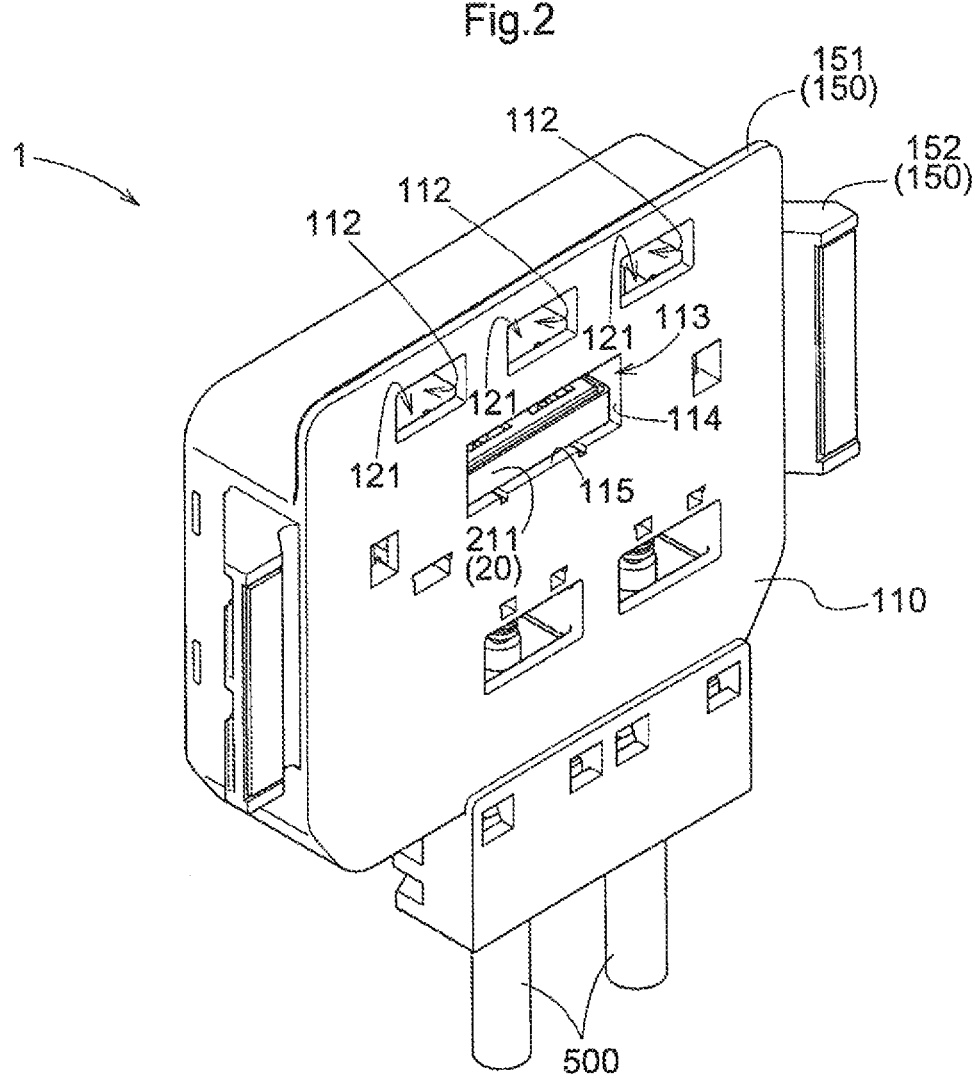
FIG. 2 is a perspective view showing a back side of the terminal box according to the embodiment.

As shown in FIG. 2 and FIG. 4, the bottom wall 110 defines an opening 113 into which the connecting portion body 211 is to be inserted. In the bottom wall 110, downwardly of the second terminal strip 202, there is disposed a rectangular-shaped closing body 111 (an example of "insulator") for covering the rear portion of the opening 113. The closing body 111 is formed integral with the bottom wall 110 of the box body 100. This closing body 111 is disposed with keeping the left and right sides of the opening 113 open and groove portions 114 are formed adjacent the left and right sides of the closing body 111. The closing body 111 and the opening 113 together form a recess 115 on the back face side of the bottom wall 110.

The connecting portion body 211 formed integral with the two first terminal strips 201, 203 will be inserted into the opening 113 from the accommodating space 140. Thereafter, as the raised portions 212 are guided to the groove portions 114 and the connecting portion body 211 is moved rearwards along the bottom wall 110, the connecting portion body 211 will be disposed within the recess 115. Since the first terminal strips 201, 203 are mounted on the projections 116. Then, the second terminal strip 202 will be placed on the projection 116 between the first terminal strips 201, 203. The connecting portion body 211 is disposed on the back side of the second terminal strip 202 across the closing body 111. That is, the closing body 111 is disposed between the second terminal strip 202 and the connecting portion body 211 along the bottom wall 110.

With the above-described arrangements, unlike e.g. the arrangement of the first terminal strips 201, 203 of a same polarity being connected to each other along the lateral wall 120 of the box body 100, the connecting portion 210 will pose no obstruction when the output line 600 is to be inserted into the accommodating portion 102. The connecting portion 210 is connected to the first terminal strips 201, 203 of the positive polarity, with reliable avoidance of contact with the output line 600 connected on the front face side of the second terminal strip 202 of the negative polarity. Further, as the connecting portion 210 is located on the back face side of the second terminal strip 202, the mounting area of the terminal box 1 relative to the solar cell module 10 can be reduced, such that power generation efficiency of the solar cell module 10 can be increased.

Between the second terminal strip 202 and the connecting portion body 211, the closing body 111 is present. With this, the insulation performance between the second terminal strip 202 of the negative polarity and the connecting body portion 211 of the positive polarity is improved. Further, the connecting portion body 211 is disposed within the recess 115, not to protrude from the back face side of the bottom wall 110. Therefore, the terminal box 1 can be mounted with the bottom wall 110 being aligned with the solar cell module 10.

Rearwardly of the opening 230 of the terminal strip 200, the pivot holding portion 240 is provided. After the leading end of the output line 600 is placed upwardly of the opening 230, the pivot holding portion 240 will be folded toward the opening 230, thereby to fix the output line 600.

As shown in FIG. 3 and FIG. 4, in the pivot holding portion 240, a support portion 242 is formed of two bridges extending in the front-rear direction. Forwardly of the support portion 242, there is formed a pivot portion 241 which is vertically pivotable about the support portion 242 and has a flat face. That is, the pivot holding portion 240 is configured like a cantilever beam whose end is fixed to the support portion 242. With this, the pivot portion 241 can be displaced with the support portion 242 acting as the pivot therefor. The pivot portion 241 is slanted upwards around the support portion 242 relative to the mounting portion 220 so that the opening 230 is kept opened under the initial state. The pivot portion 241 and the support portion 242 can be shaped to be connected in a discontinuous manner. For instance, the pivot portion 241 can have a rectangular outer shape and the support portion 242 can extend from one side thereof. Still alternatively, the outer shape of the pivot portion 241 can be round.

In the instant embodiment, the opening 230 has a rectangular shape. Instead, this can be circular. The outer shape of the pivot portion 241 and the shape of the opening 230 can be any desired shapes.

Rearwardly of the pivot holding portion 240, a diode connecting portion 250 is formed. This diode connecting portion 250 and the cable connecting portion 260 which will be described later are formed only in the first terminal strip 201 and the second terminal strip 202, not being formed in the first terminal strip 203. The diode connecting portion 250 has a slit which is opened in the left-right direction. Into this slit, a terminal 402 (see FIG. 3) of the diode 400 extending in the left-right direction will be press-fitted. With this, the diode 400 is held with ensuring electric connection between the diode 400 and the first terminal strip 201 and the second terminal strip 202.

This diode 400 comprises a bypass diode, which has a function of supplying electric current with bypassing the solar cell module 10, when power generation becomes impossible e.g. as a certain solar cell module 10 enters a shade. With this arrangement, reduction in power generation efficiency of the whole system with the solar cell module 10 incapable of power generation providing electric load thereto is prevented.

The cable connecting portion 260 has a U-shaped cross section which is formed when the terminal strip 200 is cut along the left-right direction, and on and at this portion, a core wire 502 of the output cable 500 will be placed. And, as the core wire 502 is calked as being surrounded by the U-shaped portion, electric connection between the terminal strip 200 and the output cable 500 is secured.

As shown in FIG. 2, in the front side flange portion 151 of the box body 100, three tab inlet holes 112 each having a rectangular shape are formed. These three tab inlet holes 112 are formed as through holes and disposed side by side in the left-right direction. As shown in FIG. 2 and FIG. 6, the tab inlet holes 112 are formed on the outer side of the accommodating portion 102 in the face opposing to the solar cell module 10. Incidentally, the tab inlet holes 112 can be formed partially on the inner side of the accommodating portion 102.

As shown in FIGS. 6-8, on the side of the lateral wall 120 opposing to the tab inlet holes 112, there is formed the guiding portion 170 which guides the output line 600 inserted into the tab inlet hole 112 toward the terminal strip 200. This guiding portion 170 is provided between the tab inlet hole 112 and an opening 121 formed in the front side lateral wall 120 so that the outside of the box body 100 and the accommodating space 140 are communicated with each other. The guiding portion 170 is constituted of a guiding face 171 opposing to the tab inlet hole 112 and side portions 172 on the opposed sides of the guiding portion 171 (see FIG. 1). With this, the output line 600 inserted into the tab inlet hole 112 will be introduced into the accommodating space 140 via the guiding portion 170. Incidentally, the tab inlet hole 112 is an example of "inlet hole".

In the above, the guiding face 171 has a sloped portion 173 which is sloped in a direction away from the tab inlet hole 112 as approaching the terminal strip 200. The sloped portion 173 is present at least at a portion of the guiding face 171. The output line 600 introduced through the tab inlet hole 112 will come into contact with the sloped portion 173, thus being gently bent and guided toward the terminal strip 200.

The guiding face 171 is formed, with portions of the side walls 120 protruding outside the accommodating portion 102. In this way, as the guiding face 171 is disposed on the outer side of the accommodating portion 102, there is no need for providing the accommodating space 140 with a space dedicated to the guiding face 171. As a result, the accommodating space 102 can be formed compact, and an amount of bonding agent to be introduced into the accommodating portion 102 can be restricted advantageously.

Figure 10:
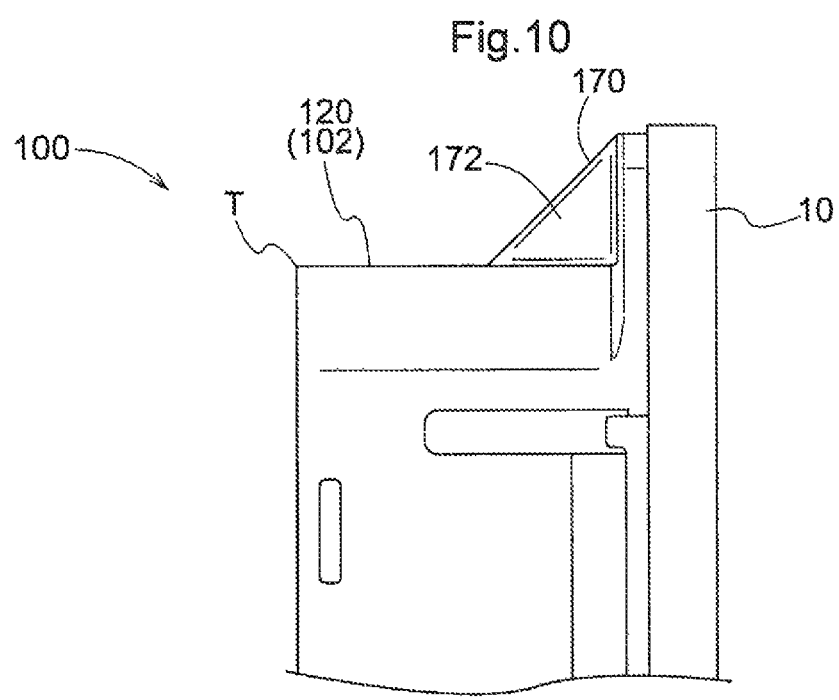
FIG. 10 is a side view showing the terminal box as being attached to a solar cell module.

The guiding face 171 is provided at a position lower than a top T of the side walls 120. The terminal box 1, as shown in FIG. 7, FIG. 8 and FIG. 10, will be connected to the solar cell module 10 with the output line 600 being provided at its edge portion 11, for instance. In the course of handling of the solar cell module 10, the box body 100 of the terminal box 1 connected to the edge portion 11 of the solar cell module 10 will be particularly susceptible to a shock as its vertical end portion coming into contact with a foreign object.

However, as the guiding face 171 is provided at the position lower than the top T of the side walls 120 as provided in the instant embodiment, as shown in FIG. 10, the amount of upward projection of the guiding portion 170 which forms the edge of the terminal box 1 can be restricted in the edge portion 11 of the solar cell module 10. Thus, accidental contact between the guiding portion 170 of the terminal box 1 and a foreign object will be made less likely to occur. Further, the volume of the area between the guiding face 171 and the tab inlet hole 112 is reduced, to that the amount of bonding agent to be introduced into the accommodating portion 102 of the box body 100 can be reduced advantageously.

2. Connecting Procedure of Output Lines

Next, with reference to the accompanying drawings, there will be explained a procedure of connecting the output line 600 of the solar cell module 10 to the terminal strip 200 inside the box body 100.

When the output line 600 is to be connected to the terminal strip 200, firstly, the output line 600 will be inserted through the tab inlet hole 112, with keeping the pivot holding portion 240 under an open posture like the second terminal strip 202 as shown in FIG. 7. Then, the output line 600 will come into contact with the guiding face 171 and bent along this face, thus being guided into the accommodating space 140 from the outer side of the accommodating portion 102. Then, the leading end portion of the output line 600 will be positioned upwardly of the opening 230 of the terminal strip 200 (see FIG. 8).

Next, by a tool such as a minus driver or the like, or a jig, the pivot portion 241 of the pivot holding portion 240 will be pivoted about the support portion 242 acting as the pivot, thus being moved downwards in the closing direction of the opening 230. Namely, the pivot holding portion 240 will be moved from the open posture to the fixed posture. When the pivot holding portion 240 assumes the fixed posture, the output line 600 will be sandwiched and fixed between the opening 230 and the pivot holding portion 240 of the terminal strip 200. With this, the output line 600 is electrically connected to the terminal strip 200 (see FIG. 9).

As described above, the output line 600 inserted toward the guiding portion 170 via the tab inlet hole 112 on the outer side of the accommodating portion 102 will be guided toward the terminal strip 200 by the guiding face 171 provided in the terminal box 1. With this, an assembly operation of assembling the output line 600 to the terminal strip 200 can be readily carried out. Further, as a portion of the guiding face 171 is sloped in the direction away from the tab inlet 112 as approaching the terminal strip 200, the output line 600 coming into contact with the guiding face 171 will be bent gently toward the terminal strip 200. Thus, the output line 600 can be guided toward the terminal strip 200 without giving stress on this output line 600.

[Other Embodiments]

(1) In the foregoing embodiment, there was shown an example wherein the closing body 111 as the bottom wall 110 is present between the connecting portion body 211 and the second terminal strip 202. However, it is also possible to employ an arrangement of no bottom wall 110 being present between the connecting portion body 211 and the second terminal strip 202.

Figure 11:
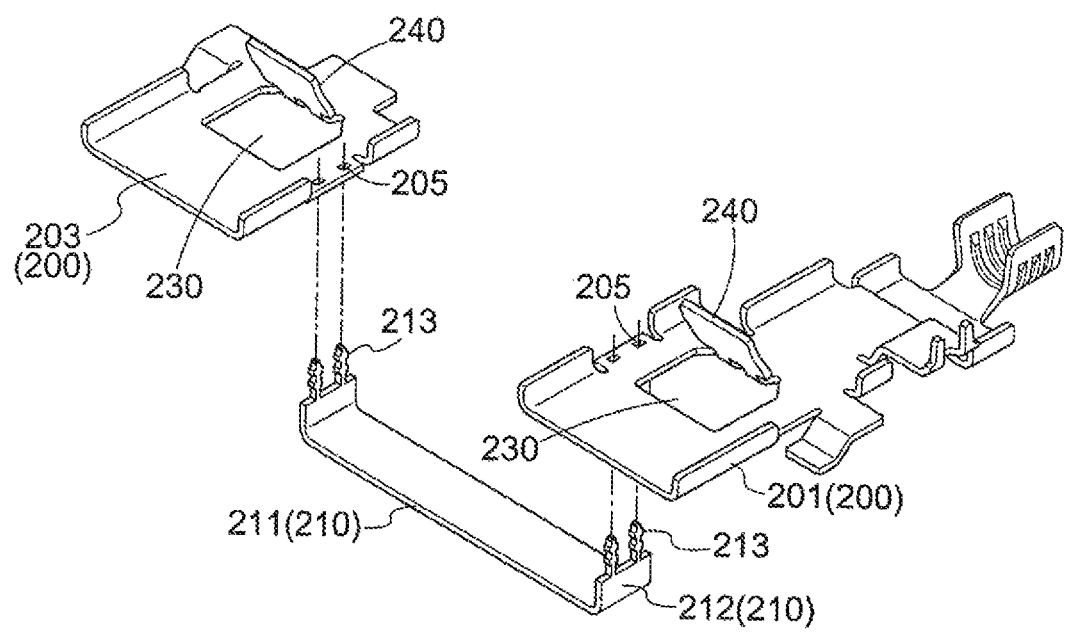
FIG. 11 is a view showing a terminal strip and a connecting portion according to a further embodiment.

(2) In the foregoing embodiment, there was shown an example wherein the two first terminal strips 201, 203 and the connecting portion 210 are formed integral each other. Alternatively, the connecting portion 210 may be formed integral with only one of the two first terminal strips 201, 203. Still alternatively, as shown in FIG. 11, the connecting portion 210 may be constituted of a member separate from the first terminal strips 201, 203. In this case, as shown in FIG. 11 for instance, the two members will be connected to each other via an engaging portion 213 (e.g. an engaging projection portion) provided in the raised portion 212 and an engaged portion 205 (e.g. an engaging hole portion) provided in the first terminal stripe 201, 203. In the case of this connecting portion 210 constituted of a member separate from the first terminal strips 201, 203, for instance, only the groove portions 114 may be provided in the bottom wall 110; and after the first terminal strips 201, 203 are fixed to the projections 116, from the back face side of the bottom wall 110, the connecting portion 210 may be connected to the first terminal strips 201, 203 via the groove portions 114.

(3) In the foregoing embodiment, there was shown an example wherein the connecting portion 210 of the two first terminal strips 201, 203 includes the flat-plate like connecting portion body 211 and the raised portions 212. Alternatively, the connecting portion 210 may have other shape as long as such other shape too establishes electric conduction of the two first terminal strips 201, 203.

The invention claimed is:

1. A terminal box comprising:
   three or more terminal strips to which output lines for extracting electric power generated by a solar cell module are connected; and
   a box body having an accommodating portion for accommodating the three or more terminal strips;
   wherein the box body includes inlet holes formed in a face of the box body opposing to the solar cell module and configured for allowing insertion of the output lines corresponding respectively to the three or more terminal strips; and
   wherein the three or more terminal strips include at least two first terminal strips of a same polarity and at least one second terminal strip insulated from the first terminal strips and having the opposite polarity to that of the first terminal strips; and
   wherein the two first terminal strips are electrically connected via a connecting portion disposed on a back face side of the second terminal strip disposed between and aside the two first terminal strips.

2. The terminal box according to claim 1, wherein the inlet holes are formed outside an occupying area of the three or more terminal strips in the face opposing to the solar cell module.

3. The terminal box according to claim 1, further comprising:
   an insulating portion which is formed integral with the box body and which is interposed between the second terminal strip and the connecting portion along the face opposing to the solar cell module.

4. The terminal box according to claim 2, further comprising:
   an insulating portion which is formed integral with the box body and which is interposed between the second terminal strip and the connecting portion along the face opposing to the solar cell module.

5. The terminal box according to claim 1, wherein the two first terminal strips and the connecting portion are formed integral.

6. The terminal box according to claim 2, wherein the two first terminal strips and the connecting portion are formed integral.

7. The terminal box according to claim 3, wherein the two first terminal strips and the connecting portion are formed integral.

8. The terminal box according to claim 4, wherein the two first terminal strips and the connecting portion are formed integral.

9. A solar cell module comprising:
   output lines for extracting electric power disposed at an edge portion; and
   the terminal box according to claim 1 connected to the edge portion.

10. A solar cell module comprising:
    output lines for extracting electric power disposed at an edge portion; and
    the terminal box according to claim 2 connected to the edge portion.

11. A solar cell module comprising:
    output lines for extracting electric power disposed at an edge portion; and
    the terminal box according to claim 3 connected to the edge portion.

12. A solar cell module comprising:
    output lines for extracting electric power disposed at an edge portion; and
    the terminal box according to claim 4 connected to the edge portion.

13. A solar cell module comprising:
    output lines for extracting electric power disposed at an edge portion; and
    the terminal box according to claim 5 connected to the edge portion.

14. A solar cell module comprising:
    output lines for extracting electric power disposed at an edge portion; and
    the terminal box according to claim 6 connected to the edge portion.

15. A solar cell module comprising:
    output lines for extracting electric power disposed at an edge portion; and
    the terminal box according to claim 7 connected to the edge portion.

16. A solar cell module comprising:
    output lines for extracting electric power disposed at an edge portion; and the terminal box according to claim 8 connected to the edge portion.

\* \* \* \* \*